United States Patent
Sinn et al.

(10) Patent No.: US 11,564,241 B2
(45) Date of Patent: Jan. 24, 2023

(54) METHOD FOR OPERATING A RADIO COMMUNICATION SYSTEM FOR AN INDUSTRIAL AUTOMATION SYSTEM, RADIO COMMUNICATION SYSTEM, BASE STATION AND SUBSCRIBER STATION

(71) Applicant: Siemens Aktiengesellschaft, Munich (DE)

(72) Inventors: Ulrich Sinn, Erlangen (DE); Christoph Weiler, Bretten (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/761,625

(22) PCT Filed: Sep. 19, 2019

(86) PCT No.: PCT/EP2019/075203
§ 371 (c)(1),
(2) Date: Mar. 18, 2022

(87) PCT Pub. No.: WO2021/052590
PCT Pub. Date: Mar. 25, 2021

(65) Prior Publication Data
US 2022/0346106 A1 Oct. 27, 2022

(51) Int. Cl.
*H04W 72/12* (2009.01)
*H04W 24/08* (2009.01)
*H04W 74/06* (2009.01)

(52) U.S. Cl.
CPC ......... *H04W 72/121* (2013.01); *H04W 24/08* (2013.01); *H04W 74/06* (2013.01)

(58) Field of Classification Search
None
See application file for complete search history.

(56) References Cited

U.S. PATENT DOCUMENTS

| | | | |
|---|---|---|---|
| 8,798,088 B1* | 8/2014 | Shetty | H04W 28/18 370/437 |
| 2008/0080531 A1* | 4/2008 | Williams | H04L 67/563 370/389 |

(Continued)

FOREIGN PATENT DOCUMENTS

| | | |
|---|---|---|
| CN | 102771174 | 11/2012 |
| CN | 104639212 | 5/2015 |

(Continued)

OTHER PUBLICATIONS

PCT International Search Report dated May 14, 2020 based on PCT/EP2019/075203 filed Sep. 19, 2019.

*Primary Examiner* — Faruk Hamza
*Assistant Examiner* — Cassandra L Decker
(74) *Attorney, Agent, or Firm* — Cozen O'Connor

(57) ABSTRACT

A method for operating a radio communication system for an industrial automation system, which includes at least one base station and a plurality of subscriber stations, wherein at predefined transmission times the base station cyclically polls datagrams to be transmitted by the subscriber stations, where the base station predefines for the subscriber stations the transmission times, within a polling cycle, for transmitting the datagrams to be transmitted, where the transmission times are each determined from a preceding transmission time by adding a polling cycle duration and subtracting a delay time, while the at least one datagram to be transmitted prior to the preceding transmission time is already in the corresponding subscriber station and ready for transmission, and where the subscriber stations transmit information to the base station regarding the corresponding delay time to determine the transmission times.

13 Claims, 3 Drawing Sheets

(56) References Cited

U.S. PATENT DOCUMENTS

| | | |
|---|---|---|
| 2011/0238774 A1 | 9/2011 | Maeda |
| 2012/0155406 A1* | 6/2012 | Kim .................... H04W 72/121 |
| | | 370/329 |
| 2014/0301375 A1 | 10/2014 | Nusairat et al. |
| 2017/0181187 A1 | 6/2017 | Asterjadhi et al. |

FOREIGN PATENT DOCUMENTS

| | | |
|---|---|---|
| EP | 1111846 | 6/2001 |
| EP | 1427150 | 6/2004 |
| EP | 1867101 | 12/2007 |
| GB | 2293943 | 4/1996 |
| GB | 2508158 | 5/2014 |
| WO | 2011100596 | 8/2011 |

* cited by examiner

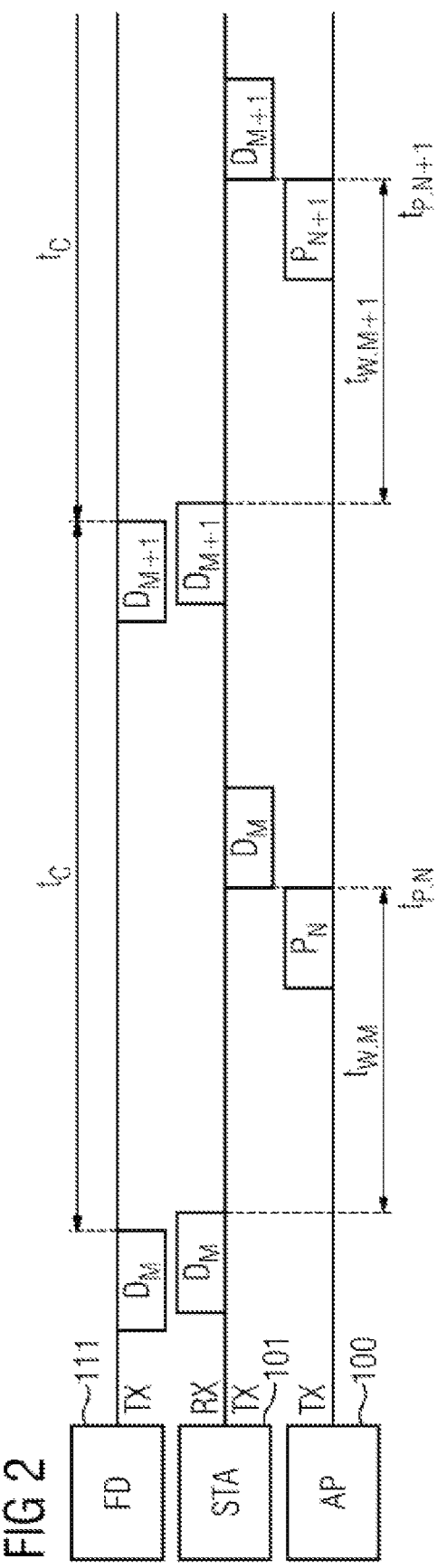
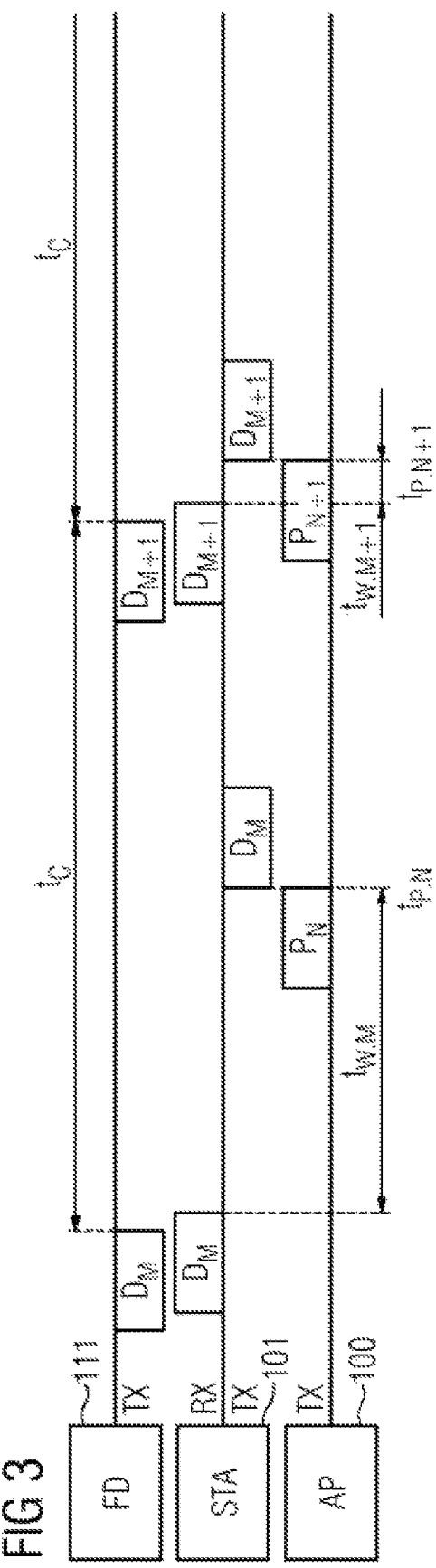

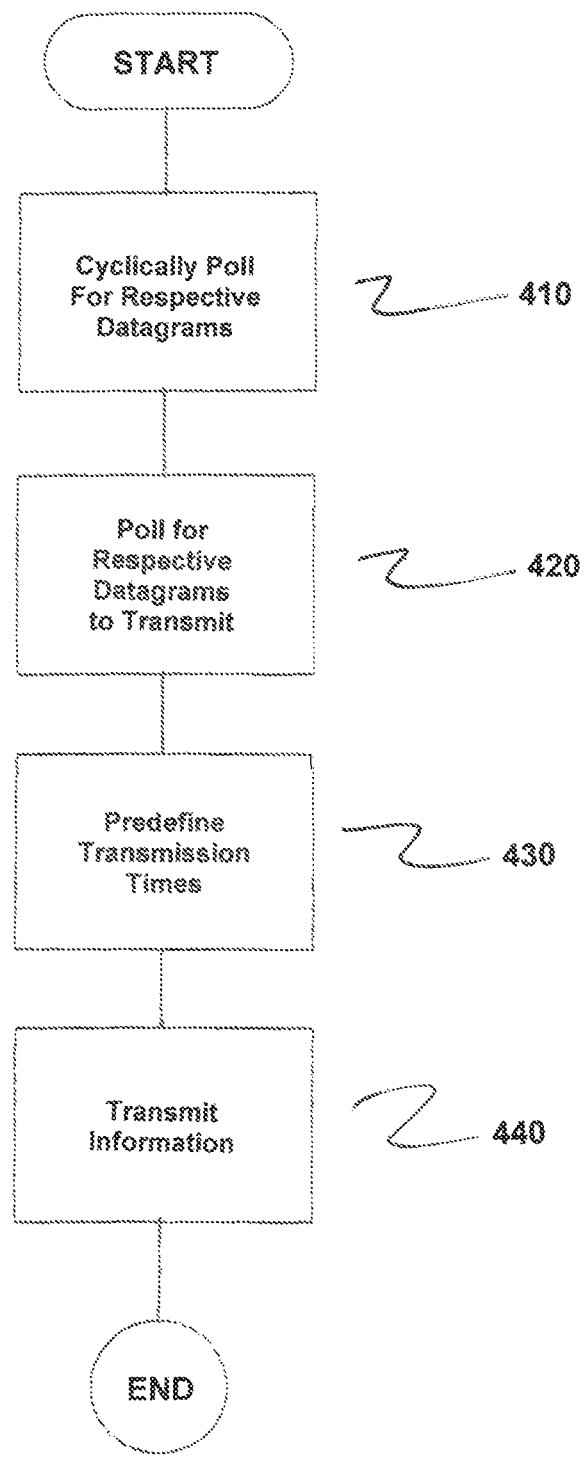

METHOD FOR OPERATING A RADIO COMMUNICATION SYSTEM FOR AN INDUSTRIAL AUTOMATION SYSTEM, RADIO COMMUNICATION SYSTEM, BASE STATION AND SUBSCRIBER STATION

CROSS-REFERENCE TO RELATED APPLICATIONS

This is a U.S. national stage of application No. PCT/EP2019/075203 filed 19 Sep. 2019.

BACKGROUND OF THE INVENTION

1. Field of the Invention

The invention relates to industrial automation systems and, more particularly, to a method for operating a radio communication system for an industrial automation system, radio communication system, base Station and subscriber station.

2. Description of the Related Art

An industrial automation system normally comprises a multiplicity of automation devices networked to one another via an industrial communication network and is used for controlling or regulating installations, machines or devices within the context of production or process automation. Time-critical constraints in industrial automation systems mean that predominantly realtime communication protocols, such as PROFINET, PROFIBUS, realtime Ethernet or time-sensitive networking (TSN), are used for communication between automation devices.

Interruptions to communication connections between computer units of an industrial automation system or automation devices can lead to undesirable or unnecessary repetition of a transmission of a service request. Additionally, messages that are not transmitted or not transmitted completely can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above problems.

Use for often extremely different applications can create problems in Ethernet-based communication networks, for example, if network resources are used for transmitting data streams or data frames with realtime demands in competition with transmitting data frames having a large payload content without specific quality of service demands. This can lead to data streams or data frames with realtime demands not being transmitted in accordance with a demanded or required quality of service.

EP 1 867 101 B1 discloses a communication system having a base station and multiple subscriber stations, where the subscriber stations transmit messages to the base station only in response to a polling message addressed to the respective subscriber station from the base station. Here, the polling messages can comprise data ranges that are intended for subscriber stations other than the particular subscriber station addressed. Each subscriber station therefore also reads polling messages that are not addressed to it directly. The polling messages in particular indicate control commands that are to be executed by the subscriber stations. When a polling message is addressed to a receiving subscriber station directly, this subscriber station executes the respective control command and returns a confirmation message to the base station. If a subscriber station receives a polling message that is not addressed to it directly, on the other hand, then although it executes the control command intended for it, the subscriber station does not initially confirm execution thereof yet, but rather only after receiving a polling message that is addressed to it directly.

EP 1 427 150 A2 describes a method for transmitting multimedia data via a WLAN, where a media access method referred to as a point coordination function (PCF) is used to allow the use of a complete transmission period by WLAN clients. The transmission period can be allocated for multimedia data dynamically in terms of its length on request. The request needs to be transmitted during a time interval during which no media access coordination via PCF occurs. The multimedia data are then transmitted during a time interval during which media access coordination by means of PCF takes place.

US 2014/301375 A1 relates to a method for calculating a timing advance value for a radio communication system. This allows a communication device to bring forward transmission times in order to guarantee reliable reception of transmitted data by a respective receiver. The timing advance value is calculated by interchanging two media access control layer messages between transmitter and receiver.

In the event of a data interchange by means of polling, a base station has no information about the time at which new data to be transmitted are available in a subscriber station. Accordingly, the polling cycle and the transmission cycle may be greatly offset relative to one another. This causes corresponding latencies. In the worst case, a polling message can arrive in a subscriber station shortly beforehand, before data to be transmitted are available in the subscriber station. Transmission of these data is then delayed by almost one polling cycle. In particular, if a data transmission is automatically repeated after a failed transmission attempt, a situation can then arise in which data transmitted in this manner are older than data that have already been received previously. There is then a risk of up-to-date data being overwritten by obsolete data.

The above problems could be solved, in principle, by selecting the polling cycle to be much shorter than the transmission cycle within which new data to be transmitted are available. This would lead to a greatly increased utilization level for radio channels used and devices involved in a data interchange, however.

SUMMARY OF THE INVENTION

In view of the foregoing, it is an object of the present invention to provide a method for operating a radio communication system for an industrial automation system that allows low-latency data transmission and efficient use of system resources, and to provide suitable apparatuses for implementing the method.

This and other objects and advantages are achieved in accordance with the invention by a radio communication system, a base station, a subscriber station and by a method for operating a radio communication system that comprises at least one base station and multiple subscriber stations. The base station, for example, a wireless local-area network (WLAN) access point, cyclically polls, at predefined transmission times, for respective datagrams that are to be transmitted by the subscriber stations, such as WLAN clients. Within a polling cycle, the base station predefines for the subscriber stations the transmission times for transmitting the datagrams to be transmitted.

In accordance with the invention, the transmission times are ascertained from a respective preceding transmission time plus a polling cycle period and minus a waiting period, during which at least one datagram to be transmitted prior to the preceding transmission time was already present and ready for transmission in the respective subscriber station. In order to ascertain the transmission times, the subscriber stations transmit information about the respective waiting period to the base station.

As a result of a dwell time for data that are to be transmitted by the subscriber stations being ascertained and the dwell time being transmitted to the base station, an optimized polling progression can be ascertained. The transmission times can, in particular, be selected such that sufficient time remains in order to be able to compensate for transmission errors on a radio link via a repeat data transmission. Additionally, when data are produced or need to be transmitted cyclically, a likelihood of individual data packets or data frames being absent can be reduced. The method in accordance with the invention additionally results in reduced latencies.

In accordance with a preferred embodiment of the present invention, the base station ascertains the respective waiting period from a recorded minimum waiting period plus a constant or continuously recorded delay. In this way, it is possible to take account of inaccuracies in time recording or other technically induced variations in the waiting period. Such inaccuracies can arise, for example, as a result of timers used for the time recording or as a result of variations when performing steps of the method in accordance with the invention. In addition, the aforementioned delay is advantageously ascertained from waiting period variances recorded over multiple polling cycles.

The subscriber stations preferably transmit the information about the respective waiting period together with the datagrams to be transmitted at a respective current or subsequent transmission time. Alternatively or additionally, the subscriber stations can ascertain an averaged waiting period over each multiple polling cycle. Here, the information transmitted to the base station about the respective waiting period comprises the averaged waiting period. It is therefore not necessary for the subscriber stations to transmit information about the respective waiting period to the base station with every polling cycle. This simplifies the implementation of the method in accordance with the invention and allows system resources for performing said method to be saved. In particular, there can be provision for the subscriber stations to transmit the information about the respective waiting period only at the request of the base station.

For selected subscriber stations or for each subscriber station individually, for example, the base station can poll for the respective datagrams to be transmitted at individual transmission times for every subscriber station in accordance with a station sequence predefined by the base station. Alternatively or additionally, each of the multiple subscriber stations may be associated to form a station group. In this case, for station groups, the base station polls for the respective datagrams to be transmitted at individual transmission times for every station group in accordance with a group and/or station sequence predefined by the base station.

When multiple subscriber stations are associated to form a station group, an individual radio channel that a channel bundle associated with the respective station group comprises is advantageously used for polling for and transmitting the respective datagrams to be transmitted for every subscriber station associated with a station group. The base station preferably ascertains the respective waiting period for each station group from a recorded minimum waiting period within the station group plus the delay.

The subscriber stations may not be in sync with one another, for example. Here, a station sequence and the transmission times are continuously stipulated in accordance with the waiting periods recorded for every polling cycle. In accordance with another or further configuration of the present invention, selected subscriber stations each have multiple terminals and/or field devices connected to them. Respective datagrams to be transmitted by the terminals and/or field devices connected to the same subscriber station are advantageously transmitted to the base station as summed datagrams. The waiting period for summed datagrams corresponds to a period of time during which at least one summed datagram to be transmitted prior to the preceding transmission time was already present and ready for transmission in the respective subscriber station.

It is also an object of the invention to provide a radio communication system for performing the method in accordance with preceding embodiments, which comprises at least one base station and multiple subscriber stations. The base station is configured to cyclically poll, at predefined transmission times, for respective datagrams that are to be transmitted by the subscriber stations. Additionally, the base station is configured so as to, within a polling cycle, predefine for the subscriber stations the transmission times for transmitting the datagrams to be transmitted. The transmission times correspond to a respective preceding transmission time plus a polling cycle period and minus a waiting period, during which at least one datagram to be transmitted prior to the preceding transmission time was already present and ready for transmission in the respective subscriber station. The subscriber stations are configured to transmit information about the respective waiting period to the base station to ascertain the transmission times.

It is also an object of the invention to provide a base station performing the method in accordance with preceding embodiments, which is configured to cyclically poll, at predefined transmission times, for respective datagrams that are to be transmitted by subscriber stations. Additionally, the base station is configured so as to, within a polling cycle, predefine for the subscriber stations the transmission times for transmitting the datagrams to be transmitted. The transmission times correspond to a respective preceding transmission time plus a polling cycle period and minus a waiting period, during which at least one datagram to be transmitted prior to the preceding transmission time was already present and ready for transmission in the respective subscriber station.

It is also an object of the invention to provide a subscriber station according for performing the method in accordance with preceding embodiments, which is configured to be cyclically polled by a base station, at predefined transmission times, for respective datagrams that are to be transmitted by the subscriber station. In addition, the subscriber station is configured to transmit information about a respective waiting period, during which at least one datagram to be transmitted prior to a preceding transmission time was already present and ready for transmission in the subscriber station, to the base station to ascertain the transmission times.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained more thoroughly below using an exemplary embodiment with reference to the drawing, in which:

FIG. 2 shows a time characteristic for a data transmission from the WLAN clients to the WLAN access point without optimized polling in accordance with the invention;

FIG. 3 shows a time characteristic for a data transmission from the WLAN clients to the WLAN access point with optimized polling in accordance with the invention; and FIG. 4 is a flowchart of the method in accordance with the invention.

DETAILED DESCRIPTION OF THE EXEMPLARY EMBODIMENTS

Figure 1:
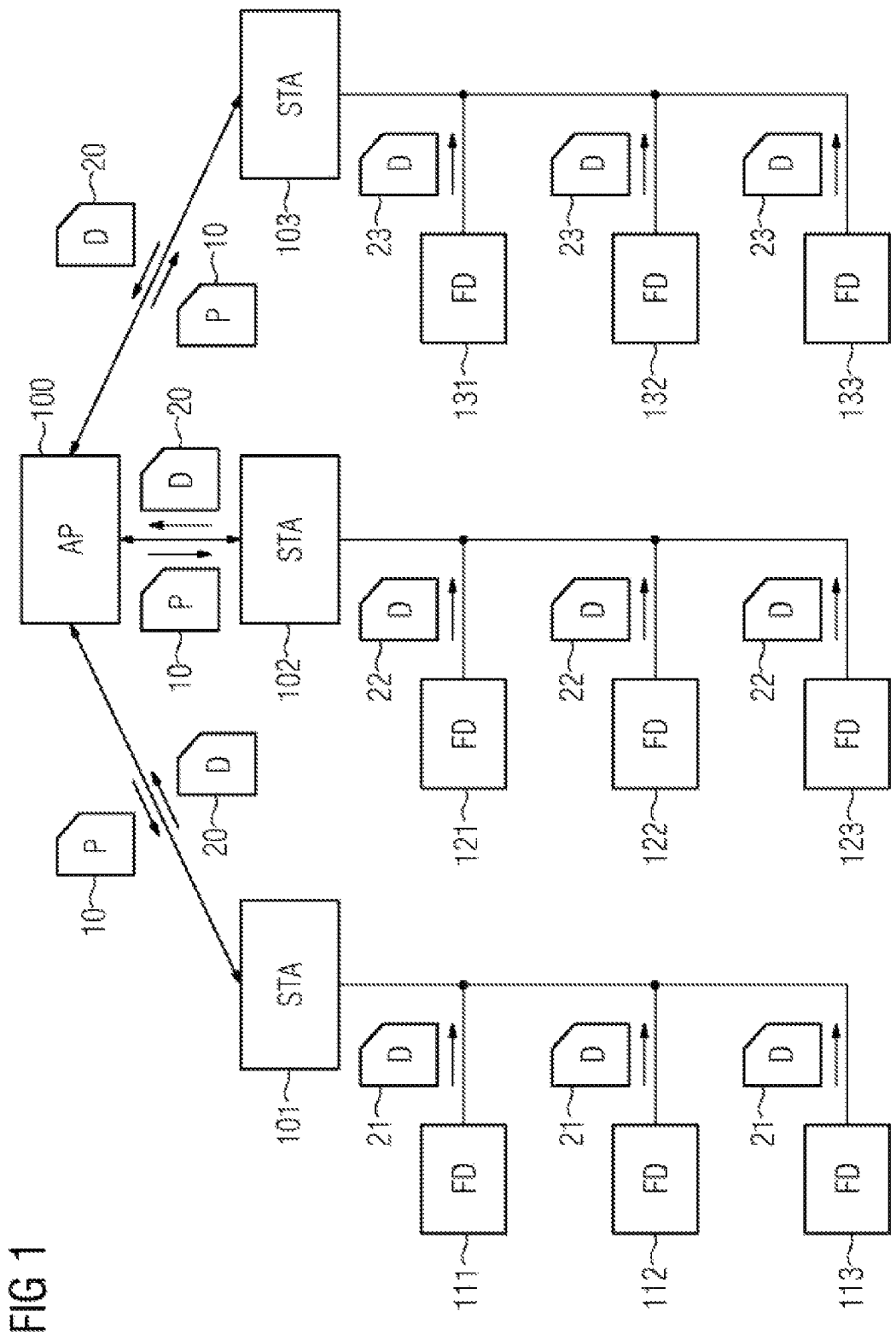
FIG. 1 shows a radio communication system for an industrial automation system with a WLAN access point and multiple WLAN clients in accordance with the invention.

The radio communication system shown in FIG. 1 comprises a WLAN access point 100 as a radio base station and multiple WLAN clients 101, 102, 103, wirelessly connectable thereto, as radio subscriber stations. In the present exemplary embodiment, the WLAN clients 101, 102, 103 each have multiple automation or field devices 111, 112, 113, 121, 122, 123, 131, 132, 133 of an industrial automation system connected to them. Automation devices include in particular programmable logic controllers, input/output units (I/O modules) or operating and observation stations of the industrial automation system.

Programmable logic controllers typically each comprise a communication module, a central processing unit and at least one input/output unit. Input/output units may fundamentally also be configured as local peripheral modules arranged remotely from a programmable logic controller. The communication module thereof can be used to connect a programmable logic controller to a switch or router or additionally to a field bus, for example. The input/output unit is used for interchanging control and measured variables between a programmable logic controller and a sensor, or a controlled machine or installation, connected to the programmable logic controller. A sensor or a machine or installation can fundamentally also be connected to a programmable logic controller via the radio communication system. The central processing unit of a programmable logic controller is provided in particular for ascertaining suitable control variables from captured measured variables. The above components of a programmable logic controller can be connected to one another via a backplane bus system, for example.

An operating and observation station is used in particular to visualize process data or measured and control variables that are processed or captured by programmable logic controllers, input/output units or sensors. In particular, an operating and observation station is used to display values of a control loop and to alter control parameters. Operating and observation stations comprise at least a graphical user interface, an input device, a processor unit and a communication module.

The WLAN access point 100, on the one hand, and the WLAN clients 101, 102, 103, on the other hand, are in particular configured and set up to interchange data frames 10, 20 with one another. In the present exemplary embodiment, the data frames 10, 20 comprise firstly polling messages 10 and secondly control data 20, in particular process data or measured and control variables, which are associated with controllers, actuators, sensors, machines or installations connected to the WLAN clients 101, 102, 103 and which the WLAN access point 100 polls the WLAN clients 101, 102, 103 for via the polling messages 10.

The WLAN access point 100 uses the polling messages 10, $P_M$, $P_{M+1}$ to cyclically poll, at predefined transmission times $t_{P,N}$, $t_{P,N+1}$, for respective control data 20, $D_M$, $D_{M+1}$ to be transmitted by the WLAN clients 101, 102, 103 (see also FIGS. 2 and 3). Within a polling cycle, the WLAN access point 100 predefines for the WLAN clients 101, 102, 103 the transmission times $t_{P,N}$, $t_{P,N+1}$ for transmitting the control data 20, $D_M$, $D_{M+1}$ to be transmitted. In the present exemplary embodiment, the polling cycle corresponds to an automation cycle within which the automation or field devices 111, 112, 113, 121, 122, 123, 131, 132, 133, FD connected to the WLAN clients 101, 102, 103 provide control data 20, $D_M$, $D_{M+1}$.

In contrast to the time characteristic without optimized polling that is shown in FIG. 2, the WLAN access point 100 in the present exemplary embodiment in accordance with FIG. 3 ascertains the transmission times $t_{P,N}$, $t_{P,N+1}$ from a respective preceding transmission time $t_{P,N-1}$, $t_{P,N}$ plus a polling cycle period $t_c$ and minus a waiting period $t_{W,M}$, $t_{W,M+1}$, during which control data 20, $D_M$, $D_{M+1}$ to be transmitted prior to the preceding transmission time $t_{P,N-1}$, $t_{P,N}$ were already present and completely ready for transmission in the respective WLAN client 101. Overall, a respective next transmission time $t_{P,N+1}$ is obtained in the case of the optimized polling shown in FIG. 3 in accordance with the following relationship:

$$t_{P,N+1} = t_{P,N} + t_c - t_{W,M}. \qquad \text{Eq. 1}$$

In order to ascertain the transmission times $t_{P,N}$, $t_{P,N+1}$, the WLAN clients 101-103 transmit information about the respective waiting period $t_{W,M}$, $t_{W,M+1}$ to the WLAN access point 100.

The WLAN access point 100 can ascertain the respective waiting period $t_{W,M}$, $t_{W,M+1}$ from a recorded minimum waiting period $t_{W,min}$ plus either a constant or continuously recorded delay $t_D$. The delay $t_D$ is preferably ascertained from waiting period variances $t_{W,Jitter}$ recorded over multiple (x) polling cycles. The respective next transmission time $t_{P,N+1}$ is therefore obtained in accordance with the following relationship:

$$t_{P,N+1} = t_{P,N} + t_c - t_{W,min} + t_D \qquad \text{Eq. 2}$$

where $$t_D = X * t_{W,Jitter} \ (x>0)$$

In comparison with the time characteristic shown in FIG. 2 for a data transmission from the WLAN clients 101, 102, 103 to the WLAN access point 100, the optimized polling in accordance with FIG. 3 results in significantly reduced waiting periods or latencies. In addition, the WLAN clients 101, 102, 103 can transmit the information about the respective waiting period $t_{W,M}$, $t_{W,M+1}$ together with the control data $D_M$ or $D_{M+1}$ to be transmitted at a respective current transmission time $t_{P.N}$ or at a subsequent transmission time $t_{P.N+1}$. Transmitting the information about the respective waiting period together with the control data to be transmitted at a later transmission time presents a solution if the information about the respective waiting period can, for technical reasons, no longer be added to a data frame with the control data to be transmitted at the respective current transmission time. A further simplification is obtained if the WLAN clients 101, 102, 103 ascertain an averaged waiting period over each of the multiple polling cycles and the information transmitted to the WLAN access point 100 about the respective waiting period comprises the averaged waiting period. Here, the information about the respective waiting period is not transmitted to the WLAN access point 100 during each polling cycle. An even further reduction in complexity is possible if the WLAN clients 101, 102, 103 transmit the information about the respective waiting period to the WLAN access point 100 only at the explicit request of the latter.

For selected WLAN clients or for each WLAN client 101, 102, 103 individually, the WLAN access point 100 can fundamentally poll for the respective control data 20 to be transmitted at individual transmission times $t_{P.N}$ for every WLAN client in accordance with a station sequence predefined by the WLAN access point 100. Alternatively or additionally, each of the multiple WLAN clients may be associated to form a station group. Here, for station groups, the WLAN access point 100 polls for the respective control data 20 to be transmitted at individual transmission times $t_{P.N}$ for every station group in accordance with a group and/or station sequence predefined by the WLAN access point 100.

When multiple WLAN clients are associated to form a station group, an individual radio channel that a channel bundle associated with the respective station group comprises is preferably used for polling for and transmitting the respective control data 20 to be transmitted for every WLAN client. By way of example, in WLAN systems based on IEEE 802.11ax, multiple WLAN clients can transmit data in a shared multi-user uplink frame (MU-UL) at the same time after a multi-user downlink trigger frame (MU-DL). A station group based on IEEE 802.11ax can in particular comprise a maximum number of WLAN clients for every possible channel width, for example 20 MHz or 40 MHz. In the case of group-by-group polling, the WLAN access point 100 ascertains the respective waiting period, in the present exemplary embodiment, for each station group from a recorded minimum waiting period $t_{W.M}$ within the station group plus the delay $t_D$.

It is fundamentally also possible for the WLAN clients 101-103 not to be, or not to have to be, in sync with one another. Here, the station sequence and the transmission times $t_{P.N}$ are continuously stipulated in accordance with the waiting periods $t_{W.M}$ recorded for every polling cycle.

Respective datagrams 21, 22, 23 to be transmitted by the terminals and/or field devices 111, 112, 113, 121, 122, 123, 131, 132, 133 connected to the same WLAN client 101, 102, 103 are advantageously transmitted to the WLAN access point 100 as summed datagrams. The waiting period $t_{W.M}$ for summed datagrams corresponds to a period of time during which at least one summed datagram to be transmitted prior to the preceding transmission time was already present and ready for transmission in the respective WLAN client 101, 102, 103.

FIG. 4 is a flowchart of the method for operating a radio communication system for an industrial automation system, where the radio communication system comprises at least one base station 100 and a plurality of subscriber stations 101, 102, 103.

The method comprises polling cyclically, by the at least one base station 100, at predefined transmission times tP.N, for respective datagrams 20 that are to be transmitted by the plurality of subscriber stations 101, 102, 103, as indicated in step 410.

Next, the at least one base station 100 polls, for selected subscriber stations of the plurality of subscriber stations 101, 102, 103 or for each individual subscriber station of the plurality of subscriber stations 101, 102, 103, for the respective datagrams to be transmitted at individual transmission times for every subscriber station of the plurality of subscriber stations 101, 102, 103 in accordance with a station sequence predefined by the at least one base station 100, as indicated in step 420.

Next, the at least one base station 100, within a polling cycle, for the plurality of subscriber stations 101, 102, 103, predefines the transmission times tP.N for transmitting the datagrams to be transmitted, as indicated in step 430. In accordance with the method of the invention, the transmission times tP.N are ascertained from a respective preceding transmission time tP.N−1 plus a polling cycle period tc and minus a waiting period tW.M, during which at least one datagram to be transmitted prior to the preceding transmission time was already present and ready for transmission in a respective subscriber station.

Next, the plurality of subscriber stations transmit 101, 102, 103 information about the respective waiting period to the at least one base station 100 to ascertain the transmission times, as indicated in step 440.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a radio communication system for an industrial automation system, in which the radio communication system comprises at least one base station and a plurality of subscriber stations, the method comprising:

polling cyclically, by the at least one base station, at predefined transmission times, for respective datagrams which are to be transmitted by the plurality of subscriber stations;

polling, by the at least one base station, for selected subscriber stations of the plurality of subscriber stations or for each individual subscriber station of the plurality of subscriber stations, for the respective datagrams to be transmitted at individual transmission times for every subscriber station of the plurality of subscriber stations in accordance with a station sequence predefined by the at least one base station;

predefining, by the at least one base station, within a polling cycle, for the plurality of subscriber stations, the transmission times for transmitting the datagrams to be transmitted, the transmission times being ascertained from a respective preceding transmission time plus a polling cycle period and minus a waiting period, during which at least one datagram to be transmitted prior to the preceding transmission time was already present and ready for transmission in a respective subscriber station; and transmitting, by the plurality of subscriber stations information about the respective waiting period to the at least one base station to ascertain the transmission times.

2. The method as claimed in claim 1, wherein the at least one base station ascertains the respective waiting period from a recorded minimum waiting period plus a constant or continuously recorded delay.

3. The method as claimed in claim 2, wherein the delay is ascertained from waiting period variances recorded over multiple polling cycles.

4. The method as claimed in claim 1, wherein the plurality of subscriber stations transmit the information about the respective waiting period together with the datagrams to be transmitted at a respective current or subsequent transmission time.

5. The method as claimed in claim 1, wherein the plurality of subscriber stations ascertain an averaged waiting period over each multiple polling cycles; and wherein the information transmitted to the at least one base station about the respective waiting period comprises the averaged waiting period.

6. The method as claimed in claim 1, wherein the plurality of subscriber stations transmit the information about the respective waiting period only at a request of the at least one base station.

7. The method as claimed in claim 1, wherein each of the plurality of subscriber stations is associated to form a station group; and wherein, for station groups, the at least one base station polls for the respective datagrams to be transmitted at individual transmission times for every station group in accordance with at least one of a group and station sequence predefined by the base station.

8. The method as claimed in claim 7, wherein an individual radio channel that a channel bundle associated with a respective station group comprises is utilized for polling for and transmitting the respective datagrams to be transmitted for every subscriber station associated with the respective station group.

9. The method as claimed in claim 8, wherein the at least one base station ascertains the respective waiting period for each station group from a recorded minimum waiting period within the station group plus a delay.

10. The method as claimed in claim 7, wherein the at least one base station ascertains the respective waiting period for each station group from a recorded minimum waiting period within the station group plus a delay.

11. The method as claimed in claim 1, wherein the plurality of subscriber stations are out of sync with one another; and wherein the station sequence and the respective transmission times are continuously stipulated in accordance with the waiting periods recorded for every polling cycle.

12. The method as claimed in claim 1, wherein the selected subscriber stations each have at least one of a plurality of terminals and a plurality of field devices connected to said selected subscriber stations respectively:

wherein respective datagrams to be transmitted by the at least one of the plurality of terminals and the plurality of field devices connected to the same subscriber station are transmitted to the at least one base station as summed datagrams; and wherein a waiting period for summed datagrams corresponds to a period of time during which at least one summed datagram to be transmitted prior to a preceding transmission time was already present and ready for transmission in a respective subscriber station.

13. A radio communication system comprising:
at least one base station; and
a plurality of subscriber stations;
wherein the at least one base station is configured to:
cyclically poll, at predefined transmission times, for respective datagrams which are to be transmitted by the plurality of subscriber stations;

poll, for selected subscriber stations of the plurality of subscriber station or poll individually for each subscriber station of the plurality of subscriber stations, for the respective datagrams to be transmitted at individual transmission times for every subscriber station of the plurality of subscriber stations in accordance with a station sequence predefined by the at least one base station; and predefine for the plurality of subscriber stations, within a polling cycle, the transmission times for transmitting the datagrams to be transmitted, the transmission times corresponding to a respective preceding transmission time plus a polling cycle period and minus a waiting period, during which at least one datagram to be transmitted prior to the preceding transmission time was already present and ready for transmission in a respective subscriber station;

wherein the plurality of subscriber stations are configured to transmit information about the respective waiting period to the at least one base station to ascertain the transmission times.

\* \* \* \* \*